United States Patent [19]
Bastos

[11] Patent Number: 5,435,975
[45] Date of Patent: Jul. 25, 1995

[54] PROCESS AND SKID-MOUNTED SYSTEM FOR INERT GAS GENERATION

[75] Inventor: Bráulio Luís C. X. Bastos, Rio de Janeiro, Brazil

[73] Assignee: Petroleo Brasileiro S.A. - PETROBRAS, Rio de Janeiro, Brazil

[21] Appl. No.: 40,603

[22] Filed: Mar. 31, 1993

[30] Foreign Application Priority Data

Apr. 1, 1992 [BR] Brazil .............................. PI 9201152

[51] Int. Cl.$^6$ .............................................. B01D 51/00
[52] U.S. Cl. .................................. 422/168; 422/182; 422/291
[58] Field of Search ...................... 422/168, 182, 291; 423/351, 385, 579

[56] References Cited

U.S. PATENT DOCUMENTS 4,729,879 3/1988 Black .................................. 422/182

FOREIGN PATENT DOCUMENTS 2171984 9/1986 United Kingdom .

Primary Examiner—Timothy M. McMahon
Attorney, Agent, or Firm—Sughrue, Mion, Zinn, Macpeak & Seas

[57] ABSTRACT

This invention refers to a process for generation of an inert gas utilized for backsurging and artificial lift in oil wells, in which the flue gas, after the discharge of the diesel engine (1), is initially cooled and submitted to a state of separation of water and eventual solid particles, being thereafter admitted into the (reciprocating) compressors (8, 10) (amounting to 4 stages), in which it shall be compressed up to the working pressure (2,500 psi-nearly 172 atm), being thereafter cooled down to the working temperature (100° F.-nearly 38° C.), being then available for utilization. The skid-mounted system for inert gas generation of this invention includes, as well, a diesel engine (1) for discharge of the flue gas as from the Turbine of the Turbocompressor (3), cooling means (4, 7, 8, 11 and 12) for temperature reduction of the flue gas, means (5, 9) for separation of water and eventual solid particles from the flue gas, and means (6, 10) for compressing the flue gas.

4 Claims, 4 Drawing Sheets

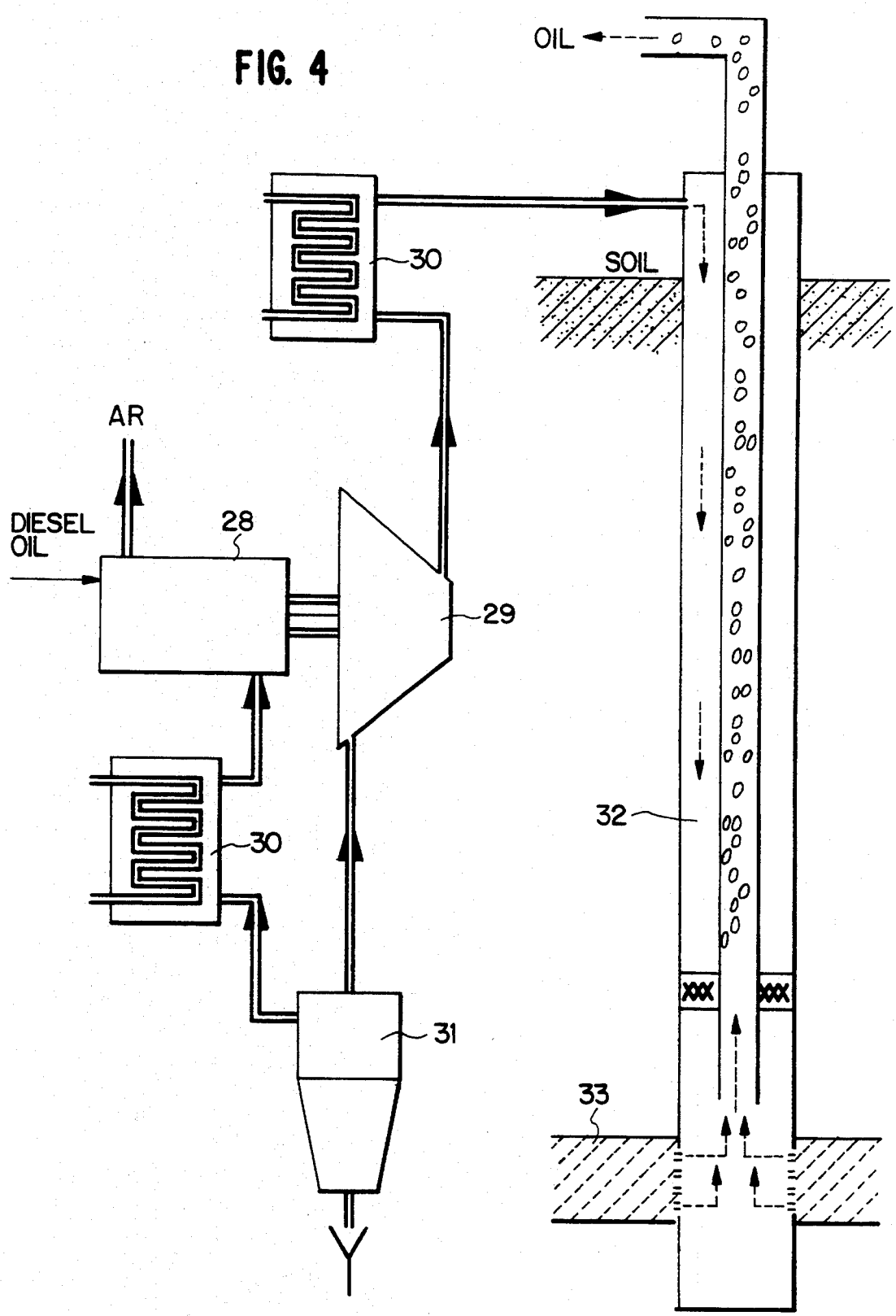

PROCESS AND SKID-MOUNTED SYSTEM FOR INERT GAS GENERATION

FIELD OF THE INVENTION

This invention refers to a process, as well as to a skid-mounted system for high-pressure inert gas generation, utilized for backsurging and artificial lift in oil wells through the utilization of flue gas from a diesel engine.

Natural gas has been traditionally utilized as lift gas for purposes of promoting crude-oil lift from the reservoir rock in depleted wells (low reservoir pressure). Natural gas is injected at a deep point of the tubing as from the annulus in the well through a hole in the column, in an artificial-lift process referred to as gas-lift. The gasification of the fluids above the injection point reduces the hydrostatic pressure which acts onto the reservoir rock, thus allowing for the influx of crude oil from the rock to the well, and from there to the surface.

Alternatively, the gas can be injected through a continuous thin tube (flexitube), run into the column down to the desired depth, in a process referred to as jet-lift.

In another example of application, the gas is utilized to remove the so-called killing fluids, saline solutions of controlled density, utilized to hold the petroleum pressures of the reservoir rock during the drilling and completion operations (installation of tubing, valves or other well-control equipment). In this case, at the end of the operations, the killing fluid is removed by the injection of gas through either the annulus or the flexitube, in a process referred to as backsurging.

In addition to natural gas, nitrogen has been traditionally utilized in backsurging operations, due to its inertness from the point of view of steel corrosion and oil combustion. Nitrogen is transported in the liquid state in cryogenic tanks, being pressurized and gasified in mobile units, assembled in-situ, close to the well. It's greatest disadvantage lies in the high cost of obtainment and transportation, which limits its application to short-duration operations.

Within the technique of inert-gas generation for utilization in petroleum production, the publication GB 2171984 A discloses a nitrogen-production process for injection in the reservoir rock (Enhanced Recovery), which includes the following stages:
- burning of a fuel gas with air in a combustion chamber of a gas turbine, thus forming a gaseous mixture of nitrogen, oxygen and other combustion products, in which the concentration of oxygen is lower than 20% by volume;
- temperature reduction and compression of the gaseous mixture thus obtained;
- separation of nitrogen from the compressed mixture by means of reverse osmosis in semi-permeable membranes; and
- injection of the gas obtained through a second well (injection well).

In-situ nitrogen generation has been proposed as well. This option, however, presents as disadvantages the maximum operation pressure of nearly 2,000 psi (138 atm), the maximum flow rate of nearly 280 cu.ft./min (476 m³/h), the minimum oxygen content of nearly 5% for this flow rate, and the excessive weight of the required equipment.

Moreover, in both the process of the above-mentioned publication and of in-situ generation, it is necessary to utilize semi-permeable membranes for nitrogen separation, but such membranes present as a great disadvantage the fact of being fragile to transportation impacts, being more adequate to large, fixed installations.

The problems of the above-described techniques are solved with the present invention, the objective of which is to utilize, for backsurging or artificial-lift in oil wells, flue gas from a diesel engine, thus eliminating the costs of liquid-nitrogen obtainment and transportation, reducing also the physical space occupied by the equipment on board, through the elimination of storage tanks, or gaseous separation plants, with the additional advantage of dispensing with the utilization of semipermeable membranes for the separation of the required gas from the gaseous mixture.

SUMMARY OF THE INVENTION

Pursuant to this invention, a process is provided for generation of an inert gas utilized for backsurging in oil wells, in which the flue gas, after the discharge of the diesel engine, is initially cooled and submitted to a stage of separation of water and eventual solid particles (cyclone), being thereafter admitted to the (reciprocating) compressors (amounting to 4 stages), in which it shall be compressed up to the working pressure (2,500 psi-nearly 172 atm), being then cooled down to the working temperature (100° F.-nearly 38° C.), and being then available for utilization.

Another objective of this invention refers to the system for inert gas generation, which includes a diesel engine for flue-gas discharge as from the turbine of the turbocompressor, cooling means for flue-gas temperature reduction, separating means for water and eventual solid particles from the flue gas, and means for compressing the flue gas, said diesel engine providing the whole energy required for the compression and cooling stage, which is hydraulically transmitted to the various elements in the system.

BRIEF DESCRIPTION OF THE DRAWINGS

These and other objectives of this invention shall now become more apparent as from the following detailed description which shall be done considering the drawings which are enclosed with this Specification, in which:

FIG. 4 represents the simplified flow chart of the petroleum artificial-lift process, utilizing flue gas from a diesel engine, generated with the process of this invention.

DETAILED DESCRIPTION OF THE INVENTION

Figure 1:
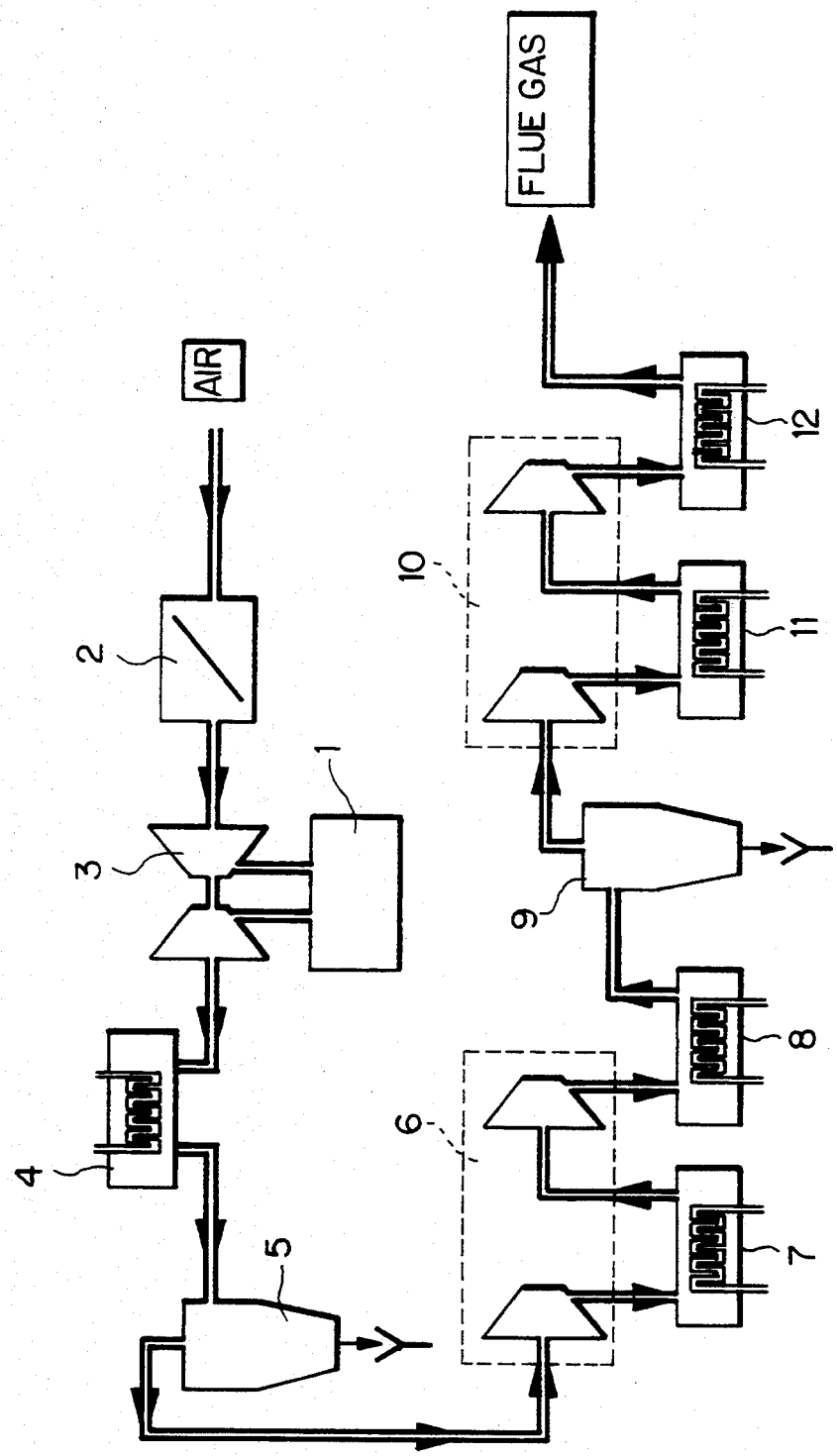
FIG. 1 represents the flow chart of the inert-gas generation process, according to this invention.

Pursuant to this invention and as it may be seen in the flow chart of FIG. 1, the process for inert-gas generation utilized for backsurging and artificial lift in oil wells includes the following stages:
a) admission of atmospheric air at nearly 14,7 psi (nearly 1 atm) and 80° F. (nearly 27° C.) into diesel engine 1 through an air filter 2 and a turbocompressor 3;

b) discharge of flue gas as from the turbine of the turbocompressor 3 of the engine 1 at nearly 550° F. (nearly 188° C.), being initially cooled in a first cooler 4 and thereafter subject to a separation of water and eventual solid particles in a first cyclone 5;

c) admission of the discharge from the first cyclone 5 with inertized gas at nearly 14.7 psi (nearly 1 atm) and 120° F. (nearly 49° C.) into a first compressor 6, the discharge of the 1st stage of the first compressor 6 at nearly 54.5 psi (nearly 3.8 atm) and 372° F. (nearly 189° C.) being admitted into a second cooler 7, being discharged and admitted at nearly 51 psi (nearly 3.5 atm) and 120° F. (nearly 49° C.) into the 2nd stage of the first compressor 6, being thereafter discharged and admitted at nearly 169 psi (nearly 13 atm) and 372° F. (nearly 189° C.) into a third cooler 8, wherefrom it is admitted into a second cyclone 9;

d) admission of the discharge from the second cyclone 9 with inertized gas at nearly 185 psi (nearly 12.8 atm) and 120° F. (nearly 49° C.) into a second compressor 10, the discharge of the 1st stage of the second compressor 10 (3rd stage of the system) at nearly 683 psi (nearly 47 atm) and 372° F. (nearly 189° C.) being admitted into a fourth cooler 11, being discharged and admitted at nearly 676 psi (nearly 47 atm) and 120° F. (nearly 49° C.) in the 2nd state (4th stage of the system) of the second compressor 10, being thereafter discharged and admitted at nearly 2,500 psi (nearly 172 atm) and 372° F. (nearly 189° C.) into a fifth cooler 12; and e) discharge of flue gas at nearly 2,490 psi (nearly 171 atm) and 100° F. (nearly 38° C.), being available for backsurging in oil wells.

The composition of the atmospheric air admitted into the diesel engine 1, as is well-known by the experts, is of nearly 79% of $N_2$ and 21% of $O_2$, and the composition of the flue gas from the diesel engine 1 varies as a function of the air/fuel ratio (refer to Table 1 below—LICHTY, L. C. & MAC-COULL, N.: INTERNAL COMBUSTION ENGINES, in: STANDARD HANDBOOK FOR MECHANICAL ENGINEERS, Seventh Edition, U.S.A., McGRAW-HILL BOOK COMPANY, 1967, pp. 9.146). For the regular operating range, the air/fuel ratio varies from 11 (rich mixture) to 17 (lean mixture).

TABLE 1

| | Summary of Flue Gas Components | | | | | |
|---|---|---|---|---|---|---|
| | Percentage by Volume | | | | | |
| Air-Fuel Ratio | $CO_2$ | $O_2$ | $CO$ | $H_2$ | $N_2$ | $H_2O$ |
| 11 | 8.76 | 0.15 | 9.14 | 4.66 | 77.08 | 13.76 |
| 12 | 10.18 | 0.44 | 6.65 | 3.39 | 79.13 | 13.93 |
| 13 | 11.60 | 0.59 | 4.31 | 2.20 | 81.09 | 14.16 |
| 14 | 13.02 | 0.63 | 2.09 | 1.07 | 82.99 | 14.46 |
| 15 | 13.23 | 1.35 | 0.99 | 0.50 | 83.72 | 14.09 |
| 16 | 12.62 | 2.49 | 0.68 | 0.35 | 83.65 | 13.30 |
| 17 | 12.00 | 3.55 | 0.48 | 0.25 | 83.51 | 12.54 |
| 18 | 11.45 | 4.49 | 0.30 | 0.16 | 83.39 | 11.88 |
| 19 | 10.90 | 5.36 | 0.20 | 0.10 | 83.23 | 11.25 |
| 20 | 10.40 | 6.15 | 0.11 | 0.06 | 83.07 | 10.68 |
| 21 | 9.92 | 6.86 | 0.08 | 0.04 | 82.90 | 10.16 |
| 22 | 9.44 | 7.55 | 0.06 | 0.03 | 82.71 | 9.65 |
| 23 | 9.00 | 8.18 | 0.05 | 0.03 | 82.53 | 9.19 |
| 24 | 8.60 | 8.74 | 0.06 | 0.03 | 82.37 | 8.78 |

As it can be inferred from TABLE 1, the flue gas which is discharged from the diesel engine 1 presents, in percentage by volume, nearly 8.76% to nearly 12.00% of $CO_2$, nearly 0.15% to nearly 3.55% of $O_2$, nearly 9.14% to nearly 0.48% of CO, nearly 4.66% to nearly 0.25% of $H_2$, nearly 77.08% to nearly 83.51% of $N_2$, and nearly 13.76% to nearly 12.54% of $H_2O$. Within these limits, the maximum concentration of $O_2$ in the flue gas is nearly 3.55%, well below, therefore, the lower limit of explosiveness for oxygen/hydrocarbons mixtures (TABLE 2 below-BERNARD, L. & VON ELBE, G.: COMBUSTION, FLAMES AND EXPLOSIONS OF GASES, Third Edition, ORLANDO, ACADEMIC PRESS INC., 1987, pp. 709), always larger than nearly 10% of $O_2$.

TABLE 2

| Percentage of Maximum Oxygen Safety (PMOS) | |
|---|---|
| Feul | PMOS* (% by volume of $O_2$) |
| Methane | 12.1 |
| Ethane | 11.0 |
| Propane | 11.4 |
| Butane and Upper Hydrocarbons | 12.1 |
| Ethylene | 10.0 |
| Propylene | 11.5 |
| Cyclopropane | 11.7 |
| Butadiene | 10.4 |
| Benzene | 11.2 |

*Ambient temperature and 1 atm.

Another objective of this invention refers further to the skid-mounted system for high-pressure inert gas generation, which includes a diesel engine 1 for discharge of the flue gas as from the turbine of the turbocompressor 3, cooling means 4, 7, 8, 11 and 12 for flue-gas temperature reduction, means 5, 9 for separation of water and eventual solid particles from the flue gas, and means 6, 10 for compression of the flue gas, said diesel engine 1 supplying the whole energy required for the compression and cooling stage, which is hydraulically transmitted to the various elements in the system.

Figure 2:
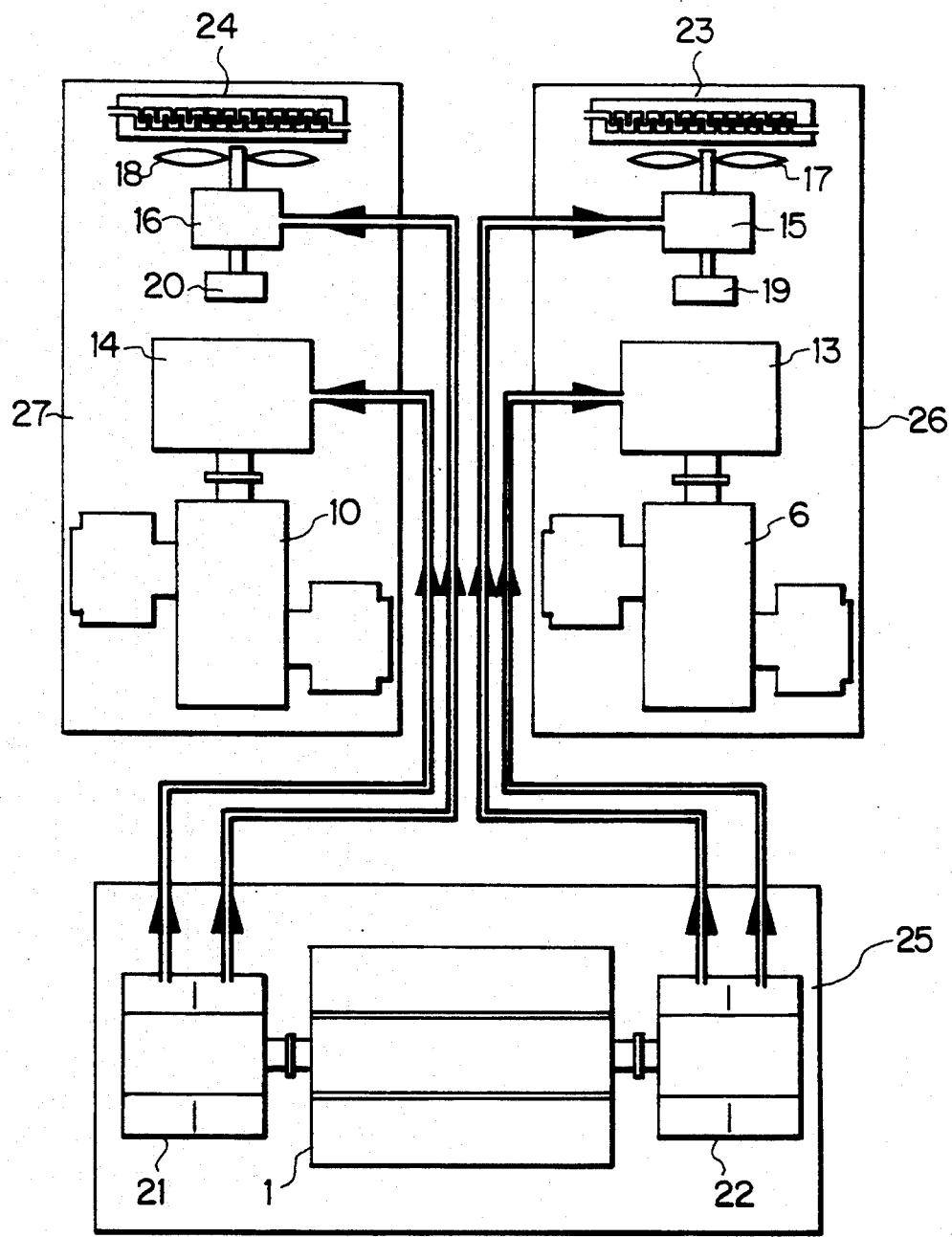
FIG. 2 is a schematic view of the lay-out and simplified hydraulic scheme, which do not show the coolers, separators, gas lines, water lines and engine accessories.

As it can be inferred from FIG. 2, in which the layout and the simplified hydraulic scheme of the system are represented, the diesel engine 1 provides the flue gas to be compressed and the power for the driving of all equipment units, which is hydraulically distributed, so that two main hydraulic engines or motors 13, 14 drive the gas compressors 6, 10 of the process, and two auxiliary hydraulic engines or motors 15, 16 drive the fans 17, 18 and the cooling-water pumps 19, 20, the hydraulic pumps 21, 22, connected to the diesel engine 1, being also shown.

Figure 3A:
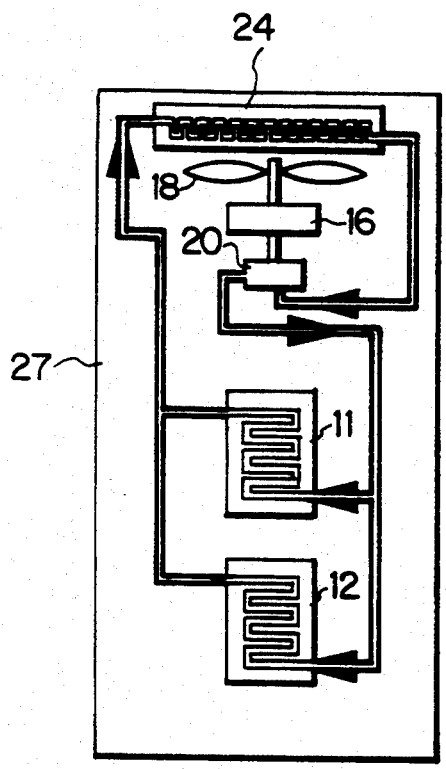
FIGS. 3A and 3B are schematic views of the gas-cooling water circuits on respective skids which do not show the compressors, separators, gas and hydraulic lines, and engine cooling.
Figure 3B:
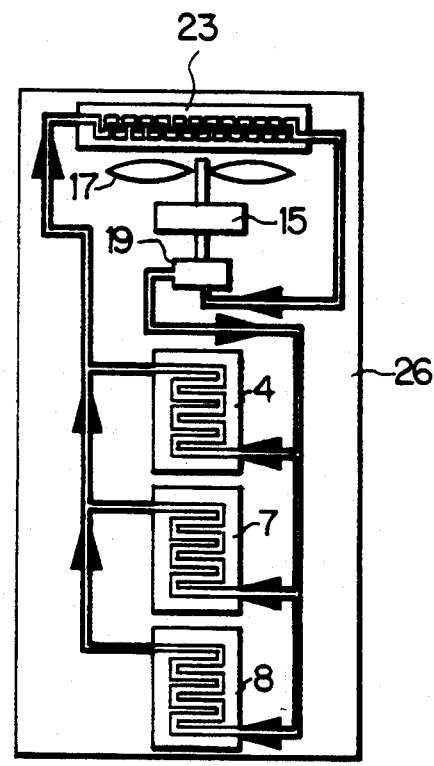

Thus, as it can be inferred from FIG. 3, which represents the gas-cooling circuit, the gas coolers 4, 7, 8, 11 and 12 are cooled by water, which is impelled by the pumps 19, 20 in closed circuit, the water being cooled in the radiators 23, 24 by means of the fans 17, 18, the pumps 19, 20 and the fans 17, 18 being driven by the hydraulic engines 15, 16.

In addition, it must be pointed out that the total estimated weight for the whole system is equal to nearly 15 tons, distributed over 3 skids 25, 26 and 27. The greatest advantage of the proposed skid-mounted system and respective process is that the diesel engine provides the whole energy required for the compression and cooling stages, which is hydraulically transmitted to the various elements in the system, it being shown, according to preliminary calculations, that the system and process proposed can produce inertized gas at a flow rate of 445 cu.ft./min (nearly 756 m³/h) and 2,500 psi (nearly 172 atm) of pressure.

Furthermore, for the sake of illustration, FIG. 4 shows a simplified flow chart of the gas-lift process, utilizing flue gas from a diesel-cycle engine generated with the process and skid-mounted system of the invention, in which the flue gas from an internal-combustion engine of diesel cycle 28, with low oxygen concentration, is compressed at a reciprocating compressor 29, driven by the diesel engine. During the process, the gas is cooled in heat exchangers 30 and purified in separators 31. Due to the low oxygen content, the compressed flue gas may be injected at a deep point of the tubing 32 of an oil well, promoting the gasification of the fluids above the injection points. Said gasification reduces the hydrostatic pressure prevailing in the reservoir rock 33, allowing for the influx of crude oil from the rock to the well, and therefrom to the surface.

I claim:

1. Apparatus for generation of an inert gas for back-surging and artificial lift for oil wells, said apparatus comprising:

a diesel engine;

means for admitting atmospheric air into said diesel engine through an air filter and a turbocompressor;

said turbocompressor including a turbine, means for discharging flue gas from the engine through said turbine of said turbocompressor, a first cooler for cooling said flue gas;

a first cyclone, means for supplying said flue gas from the turbine of the turbocompressor to said first cooler for initially cooling said flue gas and for supplying said cooled flue gas from the first cooler to said first cyclone;

a second cooler;

a first compressor having first and second stages, means for supplying said flue gas from the first cyclone after separation of water and solid particles from said flue gas to said first stage of said first compressor and from said first stage into said second cooler for further cooling said flue gas;

a third cooler, means for supplying said flue gas from said second cooler to said second stage of said first compressor for further compressing said cooled flue gas and for supplying said flue gas from said second stage of said first compressor to said third cooler for additionally cooling said flue gas;

a second cyclone, means supplying said flue gas from said third cooler to said second cyclone downstream thereof for further separating water and solid particles from said flue gas after cooling within said third cooler;

a fourth cooler;

a second compressor having first and second stages, means for supplying said flue gas from said second cyclone to said first stage of said second compressor and for supplying said flue gas from said first stage of said second compressor to said fourth cooler;

means for removing said further cooled flue gas from said fourth cooler and admitting said further cooled flue gas into said second stage of said second compressor for further gas pressurization;

a fifth cooler, means for supplying said further pressurized flue gas from said second stage of said second compressor to said fifth cooler downstream thereof; and means for discharging said further cooled flue gas within said fifth cooler from said fifth cooler after further cooling of same in a condition where said flue gas is highly inert and at a high pressure by compression within said first and second compressors for lifting crude oil from an on-site oil well.

2. An apparatus as set forth in claim 1, further comprising first, second and third skids;

said diesel engine and a pair of hydraulic pumps being mounted on said first skid with said hydraulic pumps being coupled to said diesel engine for being driven by the diesel engine and providing hydraulic flows to said second and third skids respectively;

said first and second compressors and first and second hydraulic motors being mounted on said second and third skids respectively with said first and second hydraulic motors being coupled to first and second compressors respectively and being connected to said hydraulic pumps on said first skid respectively;

a pair of fans operatively coupled to a pair of auxiliary hydraulic motors and a pair of cooling water radiators being mounted on said second and third skids respectively with said fans being mounted adjacent said radiators respectively; and said coolers being mounted on said second and third skids and further comprising circulating means connecting said radiators and said coolers respectively for circulating cooling water.

3. An apparatus as set forth in claim 2, wherein said circulating means are comprised of circulating pipes connecting said radiators and said coolers respectively and first and second water circulation pumps connected to said pipes and operatively connected to said first and second auxiliary hydraulic motors respectively.

4. An apparatus as set forth in claim 1, wherein said first, second and third coolers are mounted on said second skid and said fourth and fifth coolers are mounted on said third skid.

* * * * *